United States Patent
Nagahata et al.

(10) Patent No.: US 7,058,254 B2
(45) Date of Patent: Jun. 6, 2006

(54) OPTICAL DEVICE, OPTICAL PATH SWITCHING DEVICE AND OPTICAL PATH SWITCHING METHOD

(75) Inventors: Noriaki Nagahata, Osaka (JP); Atsushi Miyake, Osaka (JP); Masahiro Oikawa, Osaka (JP); Junichi Nakano, Tokyo (JP); Hiroshi Miyajima, Tokyo (JP)

(73) Assignees: Nippon Sheet Glass Co., Ltd., Osaka (JP); Olympus Optical Co., Ltd., Tokyo (JP)

( * ) Notice: Subject to any disclaimer, the term of this patent is extended or adjusted under 35 U.S.C. 154(b) by 1 day.

(21) Appl. No.: 10/472,073

(22) PCT Filed: Mar. 14, 2002

(86) PCT No.: PCT/JP02/02432

§ 371 (c)(1),
(2), (4) Date: Sep. 16, 2003

(87) PCT Pub. No.: WO02/075431

PCT Pub. Date: Sep. 26, 2002

(65) Prior Publication Data

US 2004/0131307 A1 Jul. 8, 2004

(51) Int. Cl.
*G02B 6/42* (2006.01)

(52) U.S. Cl. .............................. 385/22; 385/15; 385/16

(58) Field of Classification Search .................. 385/16, 385/20, 21, 22, 23
See application file for complete search history.

(56) References Cited

U.S. PATENT DOCUMENTS

| | | | | |
|---|---|---|---|---|
| 4,193,662 A | * | 3/1980 | Hara | 385/22 |
| 4,729,623 A | * | 3/1988 | Mery | 385/91 |
| 5,604,832 A | * | 2/1997 | Hall et al. | 385/89 |
| 6,002,819 A | * | 12/1999 | Saito et al. | 385/22 |
| 6,853,770 B1 | * | 2/2005 | Zhu et al. | 385/37 |

FOREIGN PATENT DOCUMENTS

| | | |
|---|---|---|
| EP | 0 883 011 A1 | 12/1998 |
| JP | 2-143221 | 6/1990 |
| JP | 4-237010 | 8/1992 |
| JP | 06-058840 | 3/1994 |
| JP | 6-75178 | 3/1994 |
| JP | 6-148537 | 5/1994 |
| JP | 07-072398 | 3/1995 |
| JP | 08-050253 | 2/1996 |
| JP | 11-295623 | 10/1999 |
| WO | WO 02/075431 | 9/2002 |

* cited by examiner

*Primary Examiner*—Jennifer Doan
(74) *Attorney, Agent, or Firm*—Whitham, Curtis, Christofferson & Cook, PC

(57) ABSTRACT

In an optical monitor for monitoring signal lights from a plurality of optical fibers, emission surfaces of the plurality of optical fibers are arranged along a straight line, and a photodetecting surface of a photodetecting element disposed so as to face the emission surfaces is moved in parallel to the straight line along which the emission surfaces are arranged in such manner that light from each of the emission surfaces is received by the photodetecting element, so that the plurality of signal lights are made incident on the photodetecting element successively. The present optical monitor thereby is capable of monitoring a large number of transmission paths while requiring a small number of components.

23 Claims, 5 Drawing Sheets

OPTICAL DEVICE, OPTICAL PATH SWITCHING DEVICE AND OPTICAL PATH SWITCHING METHOD

TECHNICAL FIELD

The present invention relates an optical device used in the field of optical communication or optical connection. More particularly, the present invention relates to an optical device in which light outputted from a selected one of a plurality of first optical function parts is inputted into a second optical function part or, alternatively light outputted from the second function part is inputted to selected one of the plurality of first optical function parts. Particularly, the invention is preferably applicable to an optical monitor or an optical switch for switching an optical path.

BACKGROUND ART

Transmission path switching is an essential function in transmission paths of optical signals. For example, optical fiber systems typically comprise the following: an optical switching function for switching the path to a new one to select an optical signal from a plurality of transmission paths, an optical monitoring function for monitoring a status of each path, etc. To this end, a mechanical optical switch for switching the optical path by relatively moving end surfaces of optical fibers facing each other is simple in structure and has desirable features such as low insertion loss, miniaturization, etc. A lot of configurations have been proposed for this type mechanical optical switch.

For example, Japanese Patent Publication No. H11-295623A has disclosed a pressing mechanism for pressing optical fiber end surfaces against each other in order to suppress loss, after a photodetecting side optical fiber is moved and positioned along arrangement of a plurality of transmission side optical fibers. Both movement and pressing are carried out by an ultrasonic linear motor and a stop position of the photodetecting side optical fiber is controlled by a computer.

Further, as described in Japanese Patent Publication No. H07-72398A, there is a known method in which optical fibers are fixed into V-grooves (grooves each shaped like a V figure in section) to thereby improve positional accuracy after switching. In the condition that the plurality of optical fibers are fixed into the V-grooves, an optical fiber facing the plurality of optical fibers is moved among the V-grooves by a drive mechanism to thereby switch the optical path.

Further, as described in Japanese Patent Publication No. H08-50253A, there has been proposed an optical switch in which a plurality of optical fibers are arranged on a surface of a column and the column is rotated by a stepping motor to thereby couple one of the optical fibers to an optical fiber facing the optical fibers.

In the mechanical optical switch for distributing signals from a plurality of optical fibers, it is necessary to optically couple a transmission side optical fiber and a reception side optical fiber to each other with a low coupling loss. That is, a mechanism for making optical axes of the transmission and reception side optical fibers coincident with each other after a switching operation is required. In order to make the optical axes coincident with each other highly accurately, a fixing jig having a V-groove structure as described above, an alignment marker, or the like, is generally used. Since these are used in combination with a drive mechanism for performing mechanical movement, there is a problem that the apparatus is complicated in structure. When the structure is complicated, there is another problem that characteristic is apt to vary on a long-term basis due to environmental change, etc. For this reason, a special mechanism for pressing optical fiber end surfaces, etc. may be additionally required to result in a further complicated structure.

In an optical switch having the V-groove structure, switching at a high speed is not easy because each optical fiber has to be once floated from a corresponding V-groove and moved when switching is performed. An operation of pressing end surfaces against each other after the movement is not adapted for high-speed switching.

In consideration of the foregoing problems, an object of the invention is to provide an optical path switching apparatus such as an optical switch or an optical monitor and an optical path switching method, each of which is simple in structure, capable of performing switching at a high speed and stable in characteristic against environmental change.

(2) An optical fiber is widely used as an optical signal transmission path for connecting a light source for converting an electric signal into an optical signal and a photo detector for converting the optical signal to an electric signal to each other. A large number of such transmission paths are arranged with increase in the volume of transmission information, so that a path from a light source to a photo detector is complicated. In order to maintain the complicated transmission paths stable over a long term, an optical monitor for monitoring occurrence of failure in anyone of the transmission paths is required.

In the optical monitor for optical transmission paths, there is adopted a means for splitting an optical fiber for inspection basically in the middle of each transmission path and detecting an inspection signal by a photo detector. For example, in a system disclosed in Japanese Patent Publication No. H06-58840A, a transmission path to be inspected is selected from a plurality of active transmission paths by an optical switch, an optical coupler is used to couple and inject an inspection signal different in wavelength from a transmission signal into the transmission path, a signal light reflected from a terminal end of the transmission path is detected by a photo detector, and the output thereof is monitored.

As represented by the aforementioned example, a conventional optical monitor on the optical fiber transmission paths has a means for coupling each optical fiber and an inspection signal to each other with high coupling efficiency. In order to monitor a large number of transmission paths, it is however necessary to provide an optical coupling system for each path and dispose a photo detector to monitor the output thereof, or it is however necessary to use a means for switching optical coupling as described in the aforementioned example. In the former case, there is a problem that the number of components for constituting the optical monitor increases and a signal processing system for monitoring the transmission paths as a whole is complicated. Further, in the latter case, there is another problem that optical coupling has to be maintained whenever the optical path is switched and that a long time is required for inspection when the number of paths is large.

Another object of the invention is to provide an optical monitor that can monitor a large number of transmission paths at a high speed in spite of a small number of components.

DISCLOSURE OF THE INVENTION

An optical device according to the invention includes: a plurality of first optical function parts having optical axes parallel to one another; a second optical function part disposed on a common straight line with which each of the optical axes intersects; and a moving mechanism for moving the second optical function part on the common straight line.

Each of the first optical function parts may be a light-emitting means, and the second optical function part may be a photodetecting means capable of receiving light emitted from selected one of the emitting means. Or each of the first optical function parts may be a light input means, and the second optical function part may be an output means capable of making light incident onto selected one of the input means.

Preferably, the first optical function parts include at least one of an optical fiber array, a collimator lens array and a light-emitting device array, and the second optical function part includes at least one of an optical fiber, a collimator lens and a semiconductor photodetecting element.

Alternatively, there may be used a configuration in which the first optical function parts include at least one of an optical fiber array, a collimator lens array and a photodetecting element array, and the second optical function part includes at least one of an optical fiber, a collimator lens and a semiconductor light-emitting device.

Preferably, the common straight line is perpendicular to each of the optical axes. Preferably, either or both of the first and second optical function parts include a gradient index rod lens (or lenses).

The moving means may move the second optical function part so that the second optical function part is located on any one of the optical axes. Or the moving means may move the second optical function part so that the second optical function part stops on selected one of the optical axes.

Preferably, there is further provided a control mechanism for controlling the moving mechanism, in which the control mechanism controls the moving mechanism to locate the second optical function part in a position where light intensity of light received by the second optical function part is maximized. There may be also used a configuration in which the control mechanism controls the moving mechanism to locate the second optical function part in a position where light intensity of light received by corresponding one of the first optical function parts is maximized.

In the invention, in an optical monitor for monitoring signal lights from a plurality of transmission paths (as a form of an optical path switching apparatus according to the invention), emission surfaces of signal lights from the plurality transmission paths are arranged along a straight line, and a photodetecting surface of a photo detecting means disposed so as to face the emission surfaces so that light is received from the emission surfaces is moved in parallel to the straight line along which the emission surfaces are arranged so that the plurality of signal lights are made incident onto the photo detecting means successively.

The emission surfaces of the signal lights are set as an end surface of an optical fiber array or an end surface of a collimator lens array. Although the photo detecting means is set as a semiconductor photodetecting element, it may be an end surface of a collimator lens.

Since the optical monitor according to the invention does not require accurate optical coupling to an optical fiber, the mechanism is not complicated even in the case where the number of light transmission paths is large. Further, since inspection can be made at a high speed, an optical monitor system simple in configuration can be provided.

Another form of the optical path switching apparatus according to the invention includes: a light source array formed in such a manner that light-emitting surfaces of a plurality of light sources are arranged along a straight line; a drive mechanism by which a photodetecting surface of a photodetecting means disposed so as to face the light-emitting surfaces is moved in parallel to the straight line so that light is received from the light source array; and a control means for controlling the drive mechanism so that the quantity of light emitted from each of the light sources and incident onto the photodetecting means is maximized.

The light source array is an end surface of an optical fiber array, an end surface of a collimator lens array, or a light-emitting device array. The photodetecting means is an end surface of an optical fiber, an end surface of a collimator lens, or a semiconductor photodetecting element.

The drive mechanism includes a guide rail disposed in parallel to the straight line along which the light-emitting surfaces are arranged, a table mounted with the photodetecting means and movable on the guide rail, and a drive portion for moving the table in accordance with a control signal issued from the control means.

An optical path switching method performed by the optical path switching apparatus configured as described above includes the following steps. That is, the steps are: the first step of inputting an instruction signal for designating an optical path to be selected into a control unit for controlling the position of the photodetecting surface; the second step of reading information concerning a temporary stop position of a drive unit from a storage device of the control unit in response to the signal, and moving the table mounted with the photodetecting means to a predetermined position in accordance with the information concerning the temporary stop position; the third step of measuring intensity of an optical signal received by the photodetecting means in the predetermined position, and moving the table by a predetermined distance in the increasing direction of the intensity; and the fourth step of repeating an operation the same as that in the third step in a new position after the movement until an end instruction is given.

A second form of the optical path switching apparatus according to the invention includes: a photodetecting means array formed in such a manner that photodetecting surfaces of the plurality of photodetecting means are arranged along a straight line; a drive mechanism by which a light-emitting surface of a light source disposed so as to face the photo detecting surfaces is moved in parallel to the straight line so that light is made incident onto the photodetecting means array; and a control means for controlling the drive mechanism so that the quantity of light emitted from the light source and incident onto any one of the plurality of photodetecting means is maximized.

The photodetecting means is an end surface of an optical fiber array, an end surface of a collimator lens array or a semiconductor photodetecting element array. The light source is an end surface of an optical fiber, an end surface of a collimator lens, or a semiconductor light-emitting device.

The drive mechanism includes a guide rail disposed in parallel to the straight line along which the photodetecting surfaces are arranged, a table mounted with the light source and movable on the guide rail, and a drive portion for moving the table in accordance with a control signal issued from the control means.

An optical path switching method performed by the optical path switching apparatus configured as described above includes the following steps. That is, the steps are: the first step of inputting an instruction signal for designating an optical path to be selected into a control unit for controlling the position of the light-emitting surface; the second step of reading information concerning a temporary stop position of a drive unit from a storage device of the control unit in response to the signal, and moving the table mounted with the light source to a predetermined position in accordance with the information concerning the temporary stop position; the third step of measuring intensity of an optical signal received by corresponding one of the photodetecting means in the designated optical path in the predetermined position, and moving the table by a predetermined distance in the increasing direction of the intensity; and the fourth step of repeating an operation the same as that in the third step in a new position after the movement until an end instruction is given.

Figure 1:
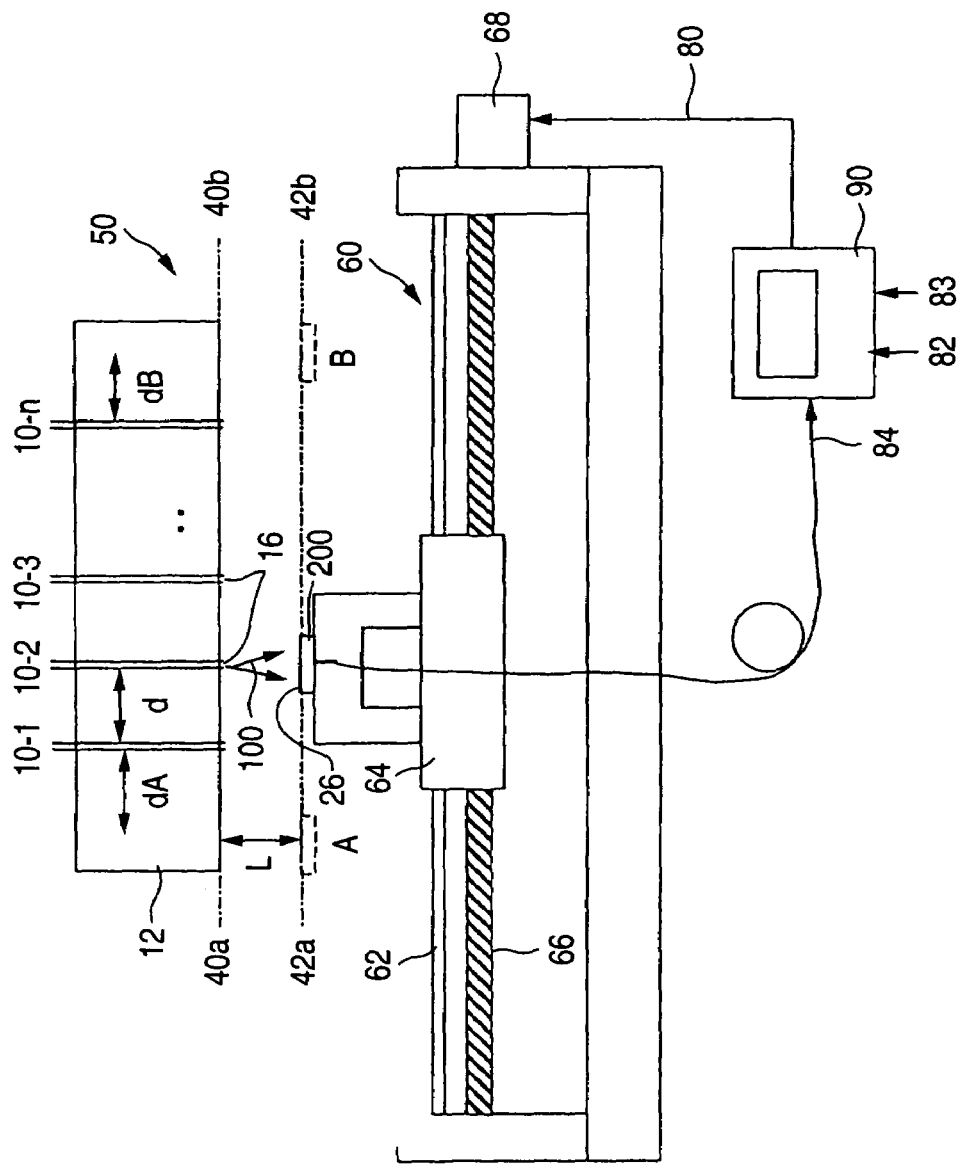
FIG. 1 is a schematic view showing the configuration of an optical monitor as a first form of an optical switching apparatus according to the invention.

In the drawings, the reference numeral 10, 20, 110 or 120 designates an optical fiber; 12, 22, 112 or 122, a gradient index rod lens; 24 or 124, an optical fiber coupler; 50 or 152, a collimator array (optical fiber array); 52 or 150, a collimator; 60, a drive mechanism; 62, a guide rail; 64, a table; 66, a ball screw; 68, a stepping motor; 90, a control computer; 100, emitted light, and 200, a photodetecting element.

BEST MODE FOR CARRYING OUT THE INVENTION

Embodiments of the invention will be described below 25 specifically. FIG. 1 shows an example of the configuration of an optical monitor according to the invention. Light emission end surfaces 16 of a plurality of optical fibers 10-1 to 10-$n$ for transmitting optical monitoring signals split from transmission paths are arranged and fixed on a straight line 40$a$–40$b$ by a retaining plate 12. Although an interval d between respective optical fibers is generally made regular, the interval d does not need to be regular and may be made irregular for the sake of convenience of design.

On the other hand, a semiconductor photodetecting element 200 as a photo detecting means is disposed so as to face the light emission end surfaces 16 in the optical fiber array 50, and a moving mechanism 60 is provided so that light 100 emitted from any one of the light emission end surfaces 16 of the optical fibers 10-1 to 10-$n$ can be made incident onto the semiconductor photodetecting element 200. A photodetecting surface 26 of the photodetecting element 200 is arranged so as to be moved along a straight line 42$a$–42$b$ in parallel while always kept at a constant distance L from the respective light emission end surfaces 16 of the light fibers. Specifically, the photodetecting element 200 is mounted on a table 64 slidable on a guide rail 62 provided in parallel to the straight line 40$a$–40$b$ along which the respective light emission end surfaces 16 of the optical fibers are arranged. The photodetecting element 200 is selected from an Si type photodetecting element and an InP type photodetecting element in accordance with the wavelength of light to be monitored, and the direction of the photodetecting element 200 is adjusted so that the light 100 emitted from the optical fiber array 50 can be made incident onto the photodetecting element 200. Incidentally, the straight line 42$a$–42$b$ corresponds to a common straight line with which each of optical axes of first optical function parts (the optical fiber array 50 in this embodiment) intersects.

A ball screw 66 fixing the table 64 is rotated by a stepping motor 68 to thereby reciprocate the table 64. Any drive mechanism may be used if it can be controlled by an external control signal 80. An ultrasonic linear motor, a voice coil motor, or the like may be used as the drive mechanism but a drive mechanism capable of moving at a high speed and excellent in rotational or moving distance accuracy is desirable.

With the aforementioned configuration, the drive mechanism may provide linear movement only, so that a small-size lightweight apparatus can be provided without provision of any complicated movable portion.

A method for monitoring optical signals in the aforementioned configuration will be described below. First, the direction and position of the guide rail 62 are adjusted so that the optical axes of the optical fibers 10-1 to 10-$n$ successively intersect with the photodetecting surface 26 of the photodetecting element 200 moving on the guide rail 62. The size $\Delta$ (which means the diameter when the photodetecting surface is circular or the length of a short side when the photodetecting surface is rectangular) of the photodetecting surface 26 of the photodetecting element 200 may be preferably smaller than the optical fiber interval d. For efficient acceptance of light emitted from each optical fiber, it is desirable that the size $\Delta$ is in the following range:

$$2L \cdot \tan(\theta/2) \leq \Delta < d$$

in which L is the distance between the light emission end surface of each optical fiber and the photodetecting surface of the photodetecting element, and $\theta$ is the angular aperture of the optical fiber. When the angular aperture of each single-mode optical fiber is set at 7° and a photodetecting element with a size $\Delta$, for example, of 1 mm is used, L is allowed to be not larger than about 8 mm.

In the aforementioned apparatus, a position A in the outside of the first optical fiber 10-1 is set as the initial position of the photodetecting element 200 so that the photodetecting element 200 moves to the position A and stops at the position A when a control computer 90 is initialized. When a signal 82 for giving an instruction to start a monitoring operation is inputted into the control computer 90, the table 64 mounted with the photodetecting element 200 moves at a constant speed toward a final position B set in the outside of the n-th optical fiber 10-$n$.

Unless a signal 83 for giving an instruction to stop is inputted to the control computer 90, the table 24 which has reached the position B reverses the moving direction, returns to the position A and repeats reciprocating motion on and on.

Figure 2:
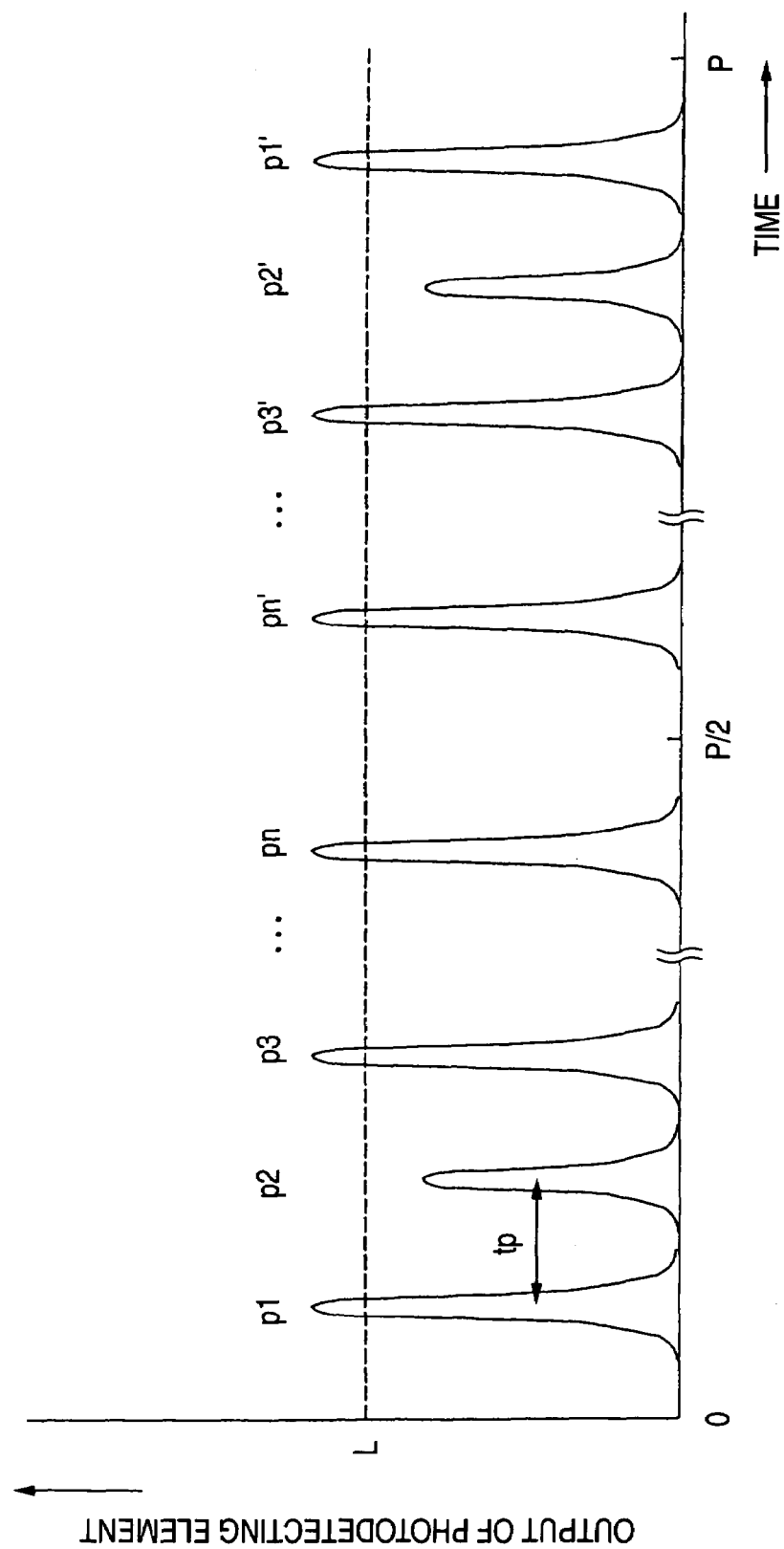
FIG. 2 is a typical graph showing an operation of the optical monitor.

FIG. 2 shows the change of an output signal 84 of the photodetecting element 200 with time on this occasion. When the moving speed of the photodetecting element is assumed to be $\underline{v}$, an interval tp between peaks of the output signal is approximately d/v. The period P for one reciprocation of the photodetecting element is expressed by 2{(n−1)·d+dA+dB}/v, in which dA is the distance between the position A and the first optical fiber 10-1, and dB is the distance between the n-th optical fiber 10-$n$ and the position B. In the drawing, signal peaks p1 and p1' correspond to the signal from the optical fiber 10-1 while signal peaks pn and pn' correspond to the signal from the optical fiber 10-n. When, for example, any peak value (p2, or p2' in the drawing) is lower than a signal intensity level IL set in advance, decision is made that some failure occurs in the transmission path.

Assume that thirty-two optical fibers are arranged in an array at intervals of d=1 mm and $\underline{v}$ is set at 100 mm/s, for example, for monitoring 32 channels of transmission paths (n=32). Then, in the case of d=dA=dB, the peak interval tp is 10 ms and the monitoring period P is about 0.66 s. Accordingly, multi-channel monitoring can be performed in a short time.

Although the aforementioned embodiment has been described on the configuration where light emitted from any one of the optical fibers is received by the semiconductor photodetecting element directly, the invention is not limited to this configuration. As a photo detector, a semiconductor photodetecting element suitable for miniaturization is most desirable, but another means such as a photo-multiplier tube, etc. may be used in accordance with the purpose. Collimator lenses may be disposed on the emission end surfaces of the optical fibers. As each of the collimator lenses, a gradient index rod lens may be used. This lens has such excellent characteristic for collimator use that the focal position of the lens can be set in accordance with the length of the lens because the lens is shaped like a column.

Another lens such as a spherical lens or an aspherical lens made of a homogeneous material may be used for constituting the collimator. Since the emitted light forms a parallel beam, it is unnecessary to widen the emission end surface interval L even in the case where the distance between each emission end surface and the photodetecting element is elongated. In addition, the size of the photodetecting surface of the photodetecting element may be made larger than the beam diameter regardless of L. In this case, the photo detecting means can include a collimator lens. The photodetecting element receives light propagated through the collimator and the optical fiber.

Figure 3:
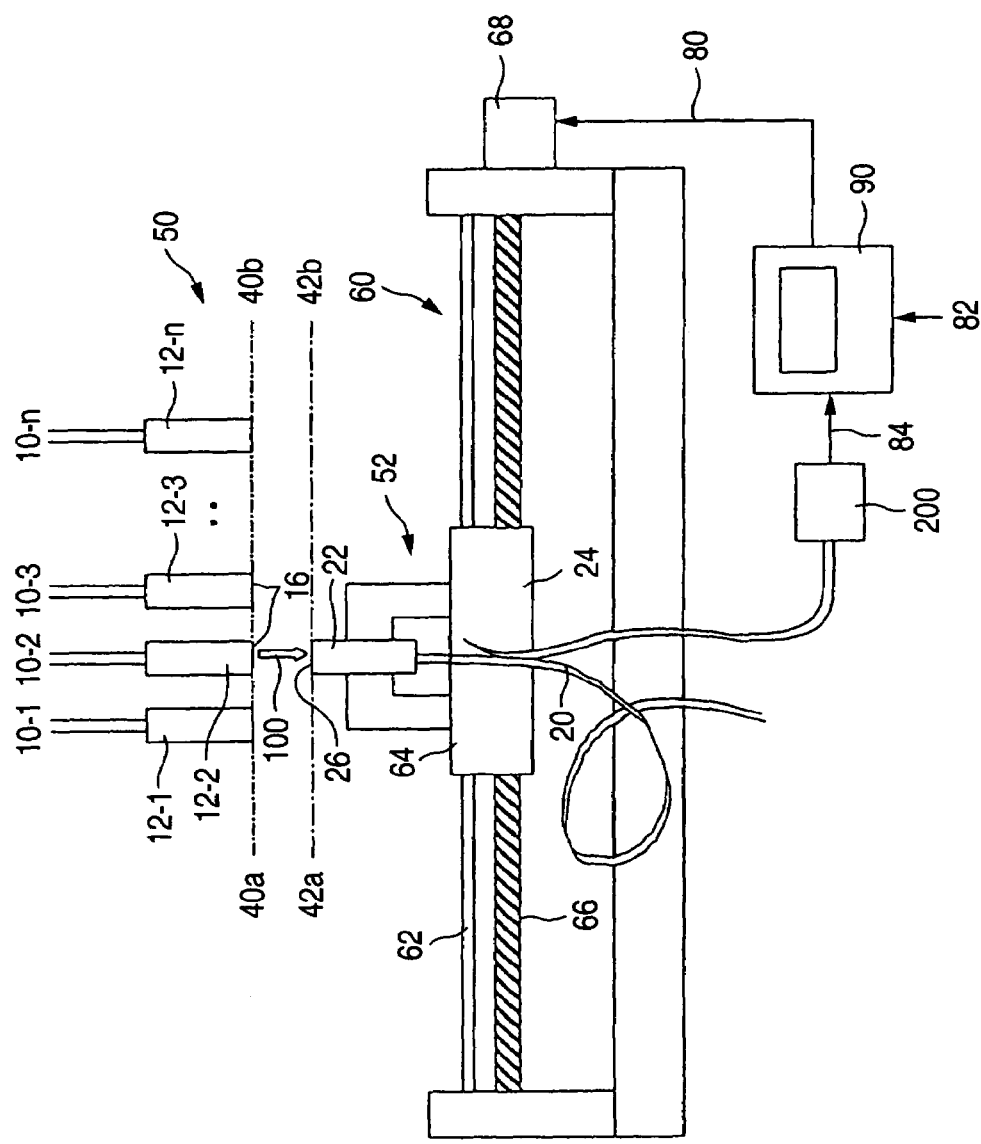
FIG. 3 is a configuration view showing a second form of the optical path switching apparatus according to the invention.

Next, another embodiment of the invention will be described specifically. FIG. 3 shows a second configuration example of the optical path switching apparatus according to the invention. A collimator array 50 is formed in such a manner that end portions of a plurality of optical fibers 10-1 to 10-n for transmitting optical signals are coupled to one-end surfaces of gradient index rod lenses 12-1 to 12-n respectively so that parallel light 100 is taken out from each of the-other-end surfaces 16 of the rod lenses. The respective light emission end surfaces 16 of the rod lenses 12-1 to 12-n are arranged and fixed on a straight line 40. On the other hand, a photodetecting side collimator 52 constituted by another rod lens 22 and an optical fiber 20 as a set is disposed so as to face each of the light emission end surfaces 16 in the collimator array 50, and a moving mechanism 60 is provided so that parallel light 100 from each of the light emission end surfaces 16 of the rod lenses 12-1 to 12-n can be made incident onto the photodetecting side collimator 52.

A light incidence end surface 26 of the photodetecting side rod lens 22 is disposed so as to be moved in parallel while always kept at a constant distance from the light emission end surfaces 16 of the light source side rod lenses 12-1 to 12-n. Specifically, a photodetecting side collimator 52 is mounted on a table 64 slidable on a guide rail 62 which is provided so as to be parallel to the straight line 40 along which the light emission end surfaces 16 of the light source side rod lenses 12-1 to 12-n are arranged. The direction of the photodetecting side collimator 52 is adjusted so that parallel light 100 from the light source side collimator array 50 can be made incident onto the photodetecting side collimator 52. A ball screw 66 fixing the table 64 is rotated by a stepping motor 68 to thereby move the table 64.

Any drive mechanism may be used if it can control the position of the table in accordance with an external control signal. An ultrasonic linear motor, a voice coil motor, or the like may be used as the drive mechanism but a drive mechanism capable of moving at a high speed and excellent in rotational or moving distance accuracy is desirable.

With the aforementioned configuration, the drive mechanism may provide linear movement only, so that a small-size lightweight apparatus can be provided without provision of any complicated movable portion.

A method for switching optical paths in the aforementioned configuration will be described below. First, the direction and position of the guide rail 62 are adjusted so that the optical axes of the light source side collimators can be made successively coincident with the optical axis of the photodetecting side collimator 52 moving on the guide rail 62. For example, assume initially that a position where the photodetecting side collimator can receive light emitted from one of the light source side collimators in the central portion is the origin. Position coordinates of the respective collimators relative to the origin are stored in a storage device in the computer 90 for performing control to drive the stepping motor 68. The positions are set as mechanical design values.

With the aforementioned preparation, when any one of the positions of the light source side collimators where the photodetecting side collimator 52 is to move is inputted as an instruction signal 82 into the control computer 90, the table 64 mounted with the photodetecting side collimator 52 moves to the designated position so that light emitted from the predetermined light source side collimator can be made incident onto the photodetecting side collimator 52 to some extent. If the position coordinates at the beginning are decided in the condition that each of the light source side collimators is actually coupled to the photodetecting side collimator 52 in an optically optimum state, considerably good coupling characteristic can be obtained by this simple setting. The optical path switching mechanism having a movable portion, however, may be affected by the change in the environment or the like so that the characteristic deteriorates with time.

In order to prevent such change with time, the invention further additionally provides a control mechanism as follows. In order to measure the intensity of an optical signal inputted to the photodetecting side collimator 52, part of light propagated through the optical fiber 20 of the photodetecting side collimator is split by an optical fiber coupler 24 so as to be made incident onto a photodetecting element 200 for measuring light intensity to thereby convert the intensity of the optical signal into an electric signal.

Figure 5:
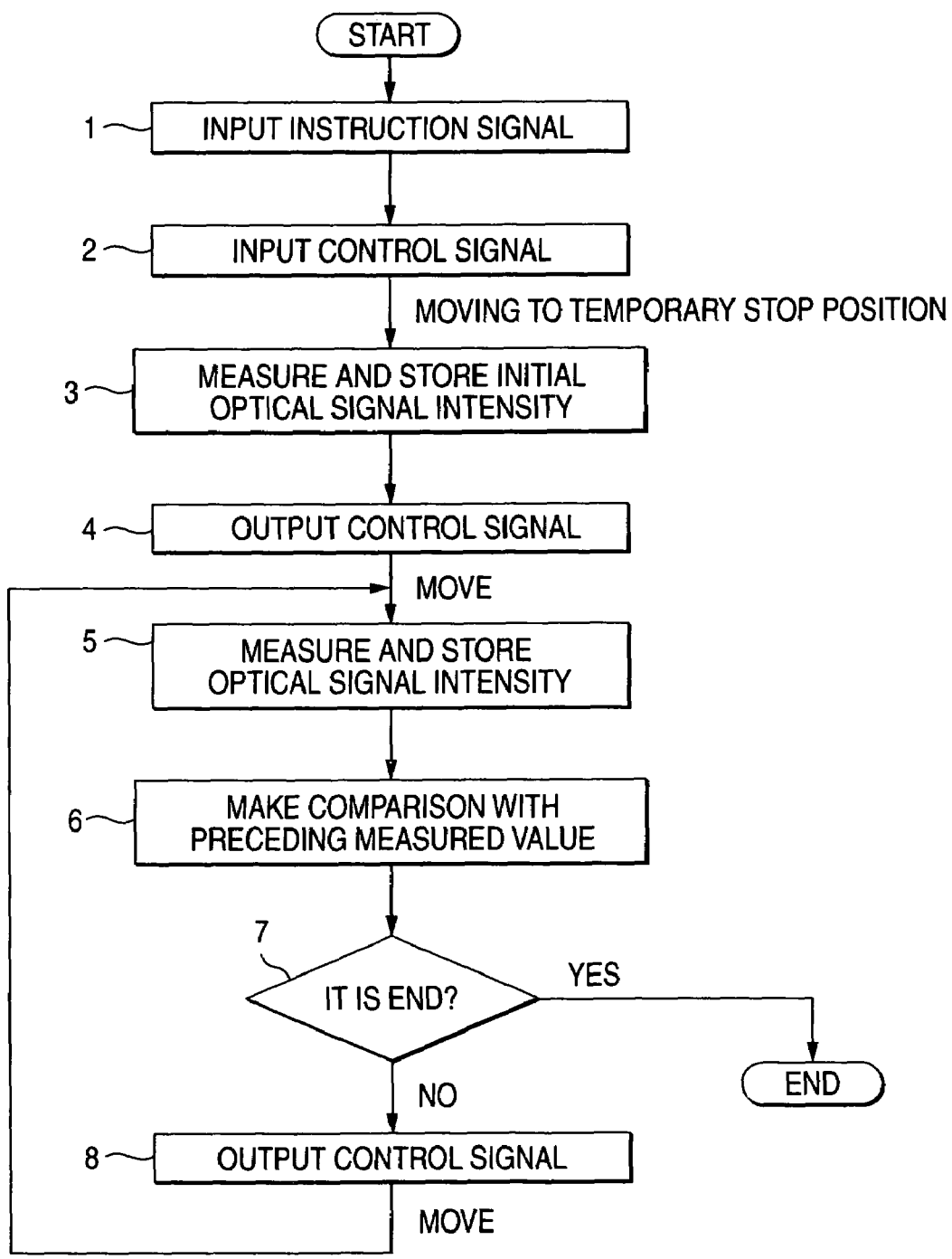
FIG. 5 is a flow chart of control in the second form of the invention.

A flow of control is as follows. The chart of the flow is shown in FIG. 5 (in which the step numbers correspond to numbers in the following description).

1. An instruction signal 82 for designating an optical path to be selected is inputted to the control computer 90.

2. In response to the instruction signal 82, the computer 90 reads information concerning a temporary stop position of the photodetecting side collimator 52 which information has been stored in the storage device (not shown) in advance, and outputs a control signal 80 to the stepping motor 68 for moving the table 64 mounted with the photodetecting side collimator 52 to a predetermined position.

3. After the photodetecting side collimator 52 has moved to a temporary stop position, the intensity of an optical signal received by the photodetecting side collimator 52 is measured and information 84 concerning the intensity of the optical signal is inputted and stored in the storage device.

4. The computer 90 outputs a control signal 80 for moving the photodetecting side collimator 52 by a predetermined distance.

5. After the photodetecting side collimator 52 has moved by the predetermined distance, the intensity of an optical signal received by the photodetecting side collimator 52 is measured and information 84 concerning the intensity of the optical signal is inputted and stored in the storage device.

6. The computer 90 compares the result with the intensity of the preceding optical signal which has been stored in the storage device, and decides a moving direction of the photodetecting side collimator 52 in accordance with the result of the comparison.

7. A judgment is made as to whether a processing end instruction is given or not. If yes, the processing is terminated.

8. If there is no end instruction, the computer 90 outputs a control signal 80 for designating a moving direction and a predetermined moving distance in accordance with the result in the step 6 and returns the processing to the step 5.

Even in the case where change with time occurs in the drive mechanism, the photodetecting side collimator 52 is controlled by the aforementioned control process so as to always approach the optimal position with respect to the light source side collimators. That is, because optimization of optical coupling is attained by the control using an electric signal according to the invention, it is unnecessary to use any high-accuracy member, etc. for positioning, so that an apparatus with a simple configuration can be provided. Also, the device characteristics are stable over time.

In the aforementioned embodiment, a gradient index rod lens is used as each collimator lens. The lens has such excellent characteristic for collimator use that the focal position of the lens can be set in accordance with the length of the lens because the lens is shaped like a column. Another lens such as a spherical lens or an aspherical lens made of a homogeneous material may be however used for constituting the collimator. Light incident onto the lens is not limited to light transmitted through an optical fiber. Light coming from a light-emitting device may be made incident onto the lens directly.

Further, light emitted from end surfaces of optical fibers or light emitted from light-emitting devices may be used directly as a light source array instead of adoption of the configuration of collimators. In this case, because the emitted light diverges, it is necessary to dispose the photodetecting surface of the photodetecting means sufficiently near each light-emitting surface.

In the photodetecting side collimator, received light may be condensed and made incident onto the photodetecting element without being guided to any optical fiber. Further, the photodetecting side may adopt a configuration in which light from a light source array is made incident onto the photodetecting element or the end surface of the optical fiber directly, instead of adoption of the configuration of a collimator.

Splitting for measuring light intensity is not limited to use of an optical fiber coupler, but a means using light leaking from an optical fiber may be used. In the case of a configuration in which the signal needs to be further propagated to a succeeding system, a method with a large loss is not desirable.

Figure 4:
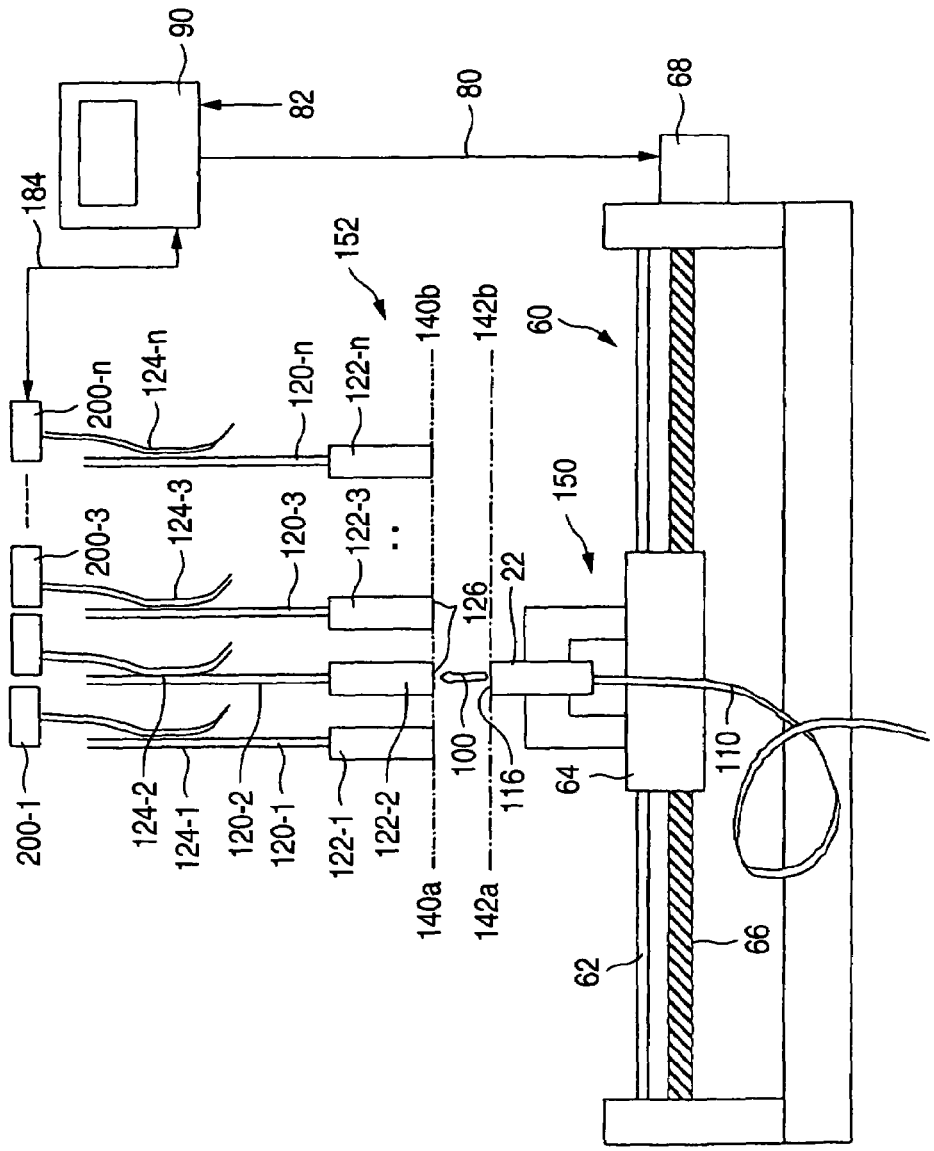
FIG. 4 is a configuration view showing a third form of the optical path switching apparatus according to the invention.

FIG. 4 shows a third configuration example of the optical path switching apparatus according to the invention. The configuration example is basically obtained by reversing the input/output direction of the light in the second configuration example. A collimator 152 is formed as a photodetecting means in such a manner that gradient index rod lenses 122-1 to 122-n are coupled to end portions of a plurality of optical fibers 120-1 to 120-n for transmitting optical signals so that parallel light 100 is taken in through the other ends of the rod lenses. Respective light incidence end surfaces 126 of the rod lenses 122-1 to 122-n are arranged and fixed on a straight line 140.

On the other hand, a light source collimator 150 constituted by another rod lens 112 and an optical fiber 110 as a set is arranged so as to face the light incidence end surfaces 126 in the collimator array 152, and a moving mechanism 60 is provided so that parallel light 100 can be made successively incident onto the respective light incidence end surfaces 126 of the aforementioned rod lenses 122-1 to 122-n. A light emission end surface 116 of the light source side rod lens 112 is disposed so as to be moved in parallel while always kept at a constant distance from the light incidence end surfaces 126 of the aforementioned photodetecting side rod lenses 122-1 to 122-n. Specifically, a light source side collimator 150 is mounted on a table 64 sliding on a guide rail 62 which is provided so as to be parallel to the straight line 140 on which the light emission end surfaces 126 of the photodetecting side rod lenses 122-1 to 122-n are arranged. The drive mechanism and the optical path switching method are the same as those in the second configuration example.

A control mechanism for moving the light source side collimator 150 to an optimal position is basically the same as that in the second configuration example except the following point. That is, optical fiber couplers 124-1 to 124-n and photodetecting elements 200-1 to 200-n for performing measurement are provided for the respective optical fibers 120-1 to 120-n in the photodetecting side collimator array 152 in order to measure the intensity of optical signals inputted into the photodetecting side collimator. An instruction signal 82 inputted into the control computer 90 has to designate a temporary stop position of the table 64 and designate any one of the photodetecting elements 200-1 to 200-n corresponding to the position in order to measure the intensity of an optical signal. Although only one of output signal lines 184 for the photodetecting element 126-1 to 126-n is shown in the drawing for the sake of simplification, n lines need to be connected from the photodetecting elements respectively.

A flow of control is as follows.

1. An instruction signal 82 for designating an optical path to be selected is inputted to the control computer 90.

2. In response to the instruction signal 82, the computer 90 reads information concerning a temporary stop position of the light source side collimator 150 which information has been stored in the storage device (not shown) in advance, and outputs a control signal 80 to the stepping motor 68 for moving the table 64 mounted with the light source side collimator 150 to a predetermined position.

3. After the light source side collimator 150 has moved to the predetermined position, the computer 90 selects a corresponding photodetecting element, and inputs and stores information 184 concerning the intensity of an optical signal received by the photodetecting side collimator, into the storage device.

4. The computer 90 outputs a control signal 80 for moving the light source side collimator 150 by a predetermined distance.

5. After the light source side collimator 150 has moved, the intensity of an optical signal received by a corresponding photodetecting side collimator is measured, and the computer 90 compares the result with the intensity of the preceding optical signal stored in the storage device and determines a moving direction of the light source side collimator 150 in accordance with the comparison result.

6. The information concerning the measured intensity of the optical signal is stored in the storage device so as to be substituted for the preceding information.

7. In accordance with the result in the step 5, the computer 90 outputs a control signal 80 for designating a moving direction and a predetermined moving distance.

8. An operation the same as that in the steps 5 and 6 is repeated until an end instruction is given.

In the aforementioned control process, an effect equal to that in the case of the second configuration example can be obtained. A modification equivalent to the second configuration example in terms of lenses used in the collimators or any other optical system is feasible.

Although the invention has been described in detail in connection with the specific embodiments, it is apparent to those skilled in the art that various changes or modifications may be made without departing from the spirit and scope of the invention.

This application is based on a Japanese Patent application (Japanese Patent Application No. 2001-075128) filed on Mar. 16, 2001 and a Japanese Patent application (Japanese Patent Application No. 2001-075126) filed on Mar. 16, 2001, the contents of which will be incorporated herein by reference.

INDUSTRIAL APPLICATION

As described above, according to the invention, a simple, small-size and lightweight optical monitor can be provided without having its configuration complicated even in the case where a large number of optical signal transmission paths are monitored. Further, according to the invention, a small-size lightweight optical path switching apparatus simple in mechanical configuration can be provided. In addition, in the method of switching optical paths according to the invention, optical performance of an apparatus can be kept stable over long time periods.

What is claimed is:

1. An optical device comprising:
a plurality of first optical function parts having optical axes parallel to one another, each of said plurality of first optical function parts includes an optical fiber for transmitting a signal light;
a single second optical function part disposed on a common straight line with which each of said optical axes intersects; and
a moving mechanism for moving said second optical function part on said common straight line;
wherein the single second optical function part interacts with a single one of the plurality of first optical function parts at a time, so that said second optical function part detects a light output from a selected first optical function part.

2. An optical device according to claim 1, wherein each of said first optical function parts is a light-emitting means; and said second optical function part is a photodetecting means capable of receiving light emitted from a selected one of said light-emitting means.

3. An optical device according to claim 1, wherein said first optical function parts include at least one of an optical fiber array, a collimator lens array, and a light-emitting device array.

4. An optical device according to claim 1, wherein said common straight line is perpendicular to each of said optical axes.

5. An optical device according to claim 1, wherein either or both of said first and second optical function parts include a gradient index rod lens.

6. An optical device according to claim 1, wherein moving means moves said second optical function part so that said second optical function part is located on any one of said optical axes.

7. An optical device according to claim 1, wherein moving means moves said second optical function part so that said second optical function part stops on selected one of said optical axes.

8. An optical device according to claim 1 wherein a size of a photodetecting surface of photodetecting means is smaller than an interval between adjacent first optical function parts.

9. An optical device according to claim 1, further comprising a control mechanism which controls said moving mechanism to locate said second optical function part in a position where light intensity of light received by said second optical function part is maximized.

10. An optical device according to claim 1, wherein a photo detector outputs a signal to a control computer in accordance with the optical signal received from the first optical function part.

11. An optical device according to claim 1, wherein a photo detector is a secomiconductor photo detecting element.

12. An optical device comprising
a plurality of first optical function parts having optical axes parallel to one another;
a single second optical function part disposed on a common straight line with which each of said optical axes intersects; and
a moving mechanism for moving said second optical function part on said common straight line;
wherein the single second optical function part intersects with a single one of the plurality of first optical function parts at a time,
each of said first optical function parts is a light emitting means, and said second optical function part is a photodetecting means capable of receiving light emitted from a selected on of said emitting means; and
a control mechanism for controlling said moving mechanism, wherein said control mechanism controls said moving mechanism to locate said second optical function part in a position where light intensity of light received by said second optical function part is maximized.

13. An optical monitor comprising:
emission surfaces of a plurality of signal lights from optical fiber transmission paths arranged along a straight line; and
a photodetecting surface of a photo detecting means disposed so as to face said emission surfaces so that light is received from said emission surfaces, and which is moved in parallel to said straight line so that said plurality of signal lights are made incident onto said photo detecting means successively and one at a time.

14. An optical monitor according to claim 13, wherein said emission surfaces of said signal lights form an end surface of a collimator lens array.

15. An optical monitor according to claim 13, wherein said photo detecting means is a semiconductor photodetecting element.

16. An optical monitor according to claim 13, wherein said photo detecting means outputs a signal to a control computer in accordance with the optical signal received from the selected optical fiber transmission path.

17. An optical path switching apparatus comprising:
a means for moving a photodetecting means to receive signal light emitted from any one of a plurality of optical fibers;
an optical light array formed in such a manner that light-emitting surfaces of said plurality of optical fibers are arranged along a straight line;
a drive mechanism by which a photodetecting surface of said photodetecting means is disposed so as to face said light-emitting surfaces so that signal light is received from said optical light array and is moved in parallel to said straight line; and
a control means for controlling said drive mechanism so that a quantity of light emitted from each of said optical fibers and incident onto said photodetecting means is maximized.

18. An optical path switching apparatus according to claim 17, characterized in that said light source array is an end surface of a collimator lens array.

19. An optical path switching apparatus according to claim 17, characterized in that said light source array is a light-emitting device array.

20. An optical path switching apparatus according to claim 17, characterized in that said photodetecting means is a semiconductor photodetecting element.

21. An optical path switching apparatus according to claim 17, wherein said photodetecting means outputs a signal to a control computer in accordance with the optical signal received from an optical fiber.

22. An optical path switching apparatus comprising:
a means for moving a photodetecting means to receive light emitted from any one of a plurality of light sources;
a light source array formed in such a manner that light-emitting surfaces of said plurality of light sources are arranged along a straight line;
a drive mechanism by which a photodetecting surface of said photodetecting means is disposed so as to face said light-emitting surfaces so that light is received from said light source array and is moved in parallel to said straight line; and
a control means for controlling said drive mechanism so that a quantity of light emitted from each of said light sources and incident onto said photodetecting means is maximized;
wherein said drive mechanism includes:
a quid rail disposed in parallel to said straight line along which said light-emitting surfaces are arranged,
a table mounted with said photodetecting means and movable on said guide rail, and
a drive portion for moving said table in accordance with a control signal issued from said control means.

23. An optical path switching method in which light-emitting surfaces of a plurality of light sources are arranged along a straight line so that a photodetecting surface of a photodetecting means disposed so as to face said light-emitting surfaces is moved in parallel to said straight line, said method comprising:
inputting an instruction signal for designating an optical path to be selected into a control unit for controlling a position of said photodetecting surface;
reading information concerning a temporary stop position of said photodetecting surface stored in a storage device in advance and outputting a control signal for moving said photodetecting surface to a predetermined position by means of said control unit in response to said instruction signal;
measuring intensity of an optical signal received by said photodetecting surface after movement of said photodetecting surface to said predetermined position, and storing said measured intensity of said optical signal into said storage device;
outputting a control signal for moving said photodetecting surface by a predetermined distance;
measuring intensity of an optical signal received by said photodetecting surface after movement of said photodetecting surface, comparing said measured intensity of said optical signal with said intensity of said preceding optical signal stored in said storage device, and deciding a moving direction of said photodetecting surface in accordance with a result of said comparison; and
outputting a control signal for designating the moving direction and a predetermined moving distance; and a seventh step of repeating an operation the same as that in the fifth and sixth steps until an end instruction is given.

* * * * *